(12) United States Patent
Williamson et al.

(10) Patent No.: US 8,834,767 B1
(45) Date of Patent: Sep. 16, 2014

(54) COMPOSITE RESIN PANELS WITH SHAPED EDGES AND METHODS AND APPARATUS FOR MAKING THE SAME

(75) Inventors: Kirk D. Williamson, Orem, UT (US);
Flintoff C. Ringger, Provo, UT (US);
Matthew D. Boyack, Payson, UT (US)

(73) Assignee: Giovanni Holdings, LLC, Lindon, UT (US)

( * ) Notice: Subject to any disclaimer, the term of this patent is extended or adjusted under 35 U.S.C. 154(b) by 262 days.

(21) Appl. No.: 13/363,371

(22) Filed: Jan. 31, 2012

Related U.S. Application Data

(63) Continuation-in-part of application No. 12/916,293, filed on Oct. 29, 2010, now Pat. No. 8,501,069, which is a continuation-in-part of application No. 11/726,727, filed on Mar. 21, 2007, now Pat. No. 8,480,939.

(51) Int. Cl.
*B29C 41/12* (2006.01)

(52) U.S. Cl.
USPC ............................ 264/259; 264/299; 264/308

(58) Field of Classification Search
CPC ........ B32B 38/14; B29C 41/02; B29C 41/22; B29C 67/0044
USPC ............................ 264/78, 132, 259, 299, 308
See application file for complete search history.

(56) References Cited

U.S. PATENT DOCUMENTS

| | | | |
|---|---|---|---|
| 2,405,528 A * | 8/1946 | Skolnik .......................... 156/200 |
| 3,330,712 A | 7/1967 | Rowe | |
| 3,331,175 A | 7/1967 | Terrio | |
| 3,504,063 A | 3/1970 | Lemelson | |
| 3,520,509 A | 7/1970 | Carey | |
| 3,544,674 A * | 12/1970 | Barron ........................... 264/255 |
| 4,478,963 A | 10/1984 | McGarry | |
| 5,223,598 A | 6/1993 | Yamada et al. | |
| 5,547,737 A | 8/1996 | Evans et al. | |
| 5,628,949 A * | 5/1997 | Bordener ....................... 264/161 |
| 5,766,500 A | 6/1998 | Bordener | |
| 5,868,957 A * | 2/1999 | Bordener .................... 249/114.1 |
| 5,906,875 A * | 5/1999 | Bordener .......................... 428/81 |
| 6,578,476 B2 | 6/2003 | Liguori et al. | |
| 6,656,561 B1 * | 12/2003 | Subbulu .......................... 428/77 |
| 6,686,315 B1 | 2/2004 | Creed | |

(Continued)

FOREIGN PATENT DOCUMENTS

EP    0 600 187 A1    6/1994

OTHER PUBLICATIONS

International Searching Authority; United States Patent and Trademark Office, "International Search Report," in related PCT application No. PCT/US2008/003769, mailed Jul. 25, 2008.

*Primary Examiner* — James Sanders
(74) *Attorney, Agent, or Firm* — Durham Jones & Pinegar Intellectual Property Law Group

(57) ABSTRACT

A process for making a resin panel having a shaped edge includes applying a resin material to a surface of a flat mold to form a layer of resin, partially curing the layer of resin, shaping an edge portion of the layer of resin with a shaped mold, applying a matrix material to the partially cured, partially shaped layer of resin, and curing the layer of resin and the matrix material to form a panel. In some embodiments, a pattern, design or image may be applied to the resin panel. Methods for forming other shaped components, such as edge pieces, from resin, are also disclosed.

27 Claims, 12 Drawing Sheets

(56) References Cited

U.S. PATENT DOCUMENTS

| | | |
|---|---|---|
| 6,699,419 B1 | 3/2004 | Kia et al. |
| 6,964,722 B2 | 11/2005 | Taylor et al. |
| 7,001,558 B2 * | 2/2006 | Baldoni .................. 264/219 |
| 7,001,660 B2 | 2/2006 | Garitano |
| 7,048,886 B2 * | 5/2006 | Nelson et al. .................. 264/310 |
| 7,108,890 B2 | 9/2006 | Horne et al. |
| 7,520,217 B2 | 4/2009 | Roberts et al. |
| 2003/0008112 A1 | 1/2003 | Cole et al. |
| 2004/0089407 A1 | 5/2004 | Halewood |
| 2005/0227006 A1 | 10/2005 | Segall |
| 2006/0126141 A1 | 6/2006 | Hirao et al. |
| 2006/0203058 A1 | 9/2006 | Nerad et al. |
| 2007/0020459 A1 | 1/2007 | Roberts et al. |

* cited by examiner

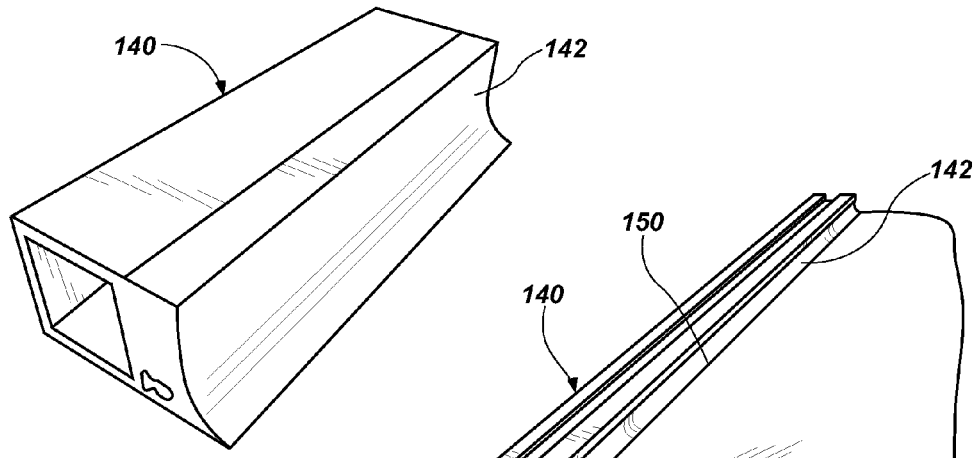
FIG. 9
FIG. 10
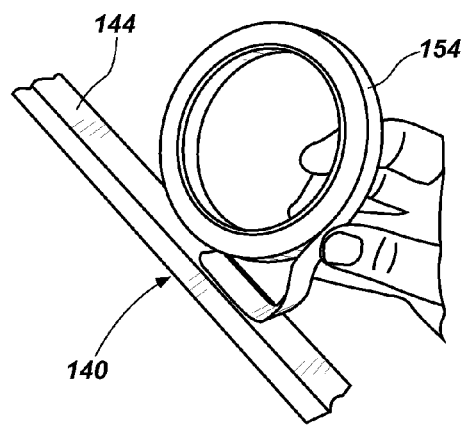
FIG. 11
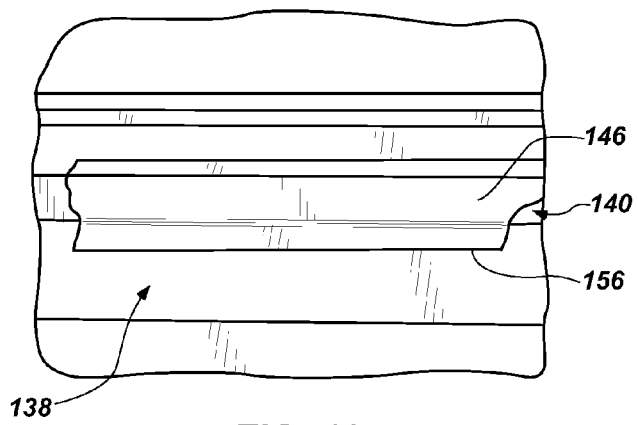
FIG. 12

US 8,834,767 B1

COMPOSITE RESIN PANELS WITH SHAPED EDGES AND METHODS AND APPARATUS FOR MAKING THE SAME

CROSS-REFERENCE TO RELATED APPLICATIONS

This application is a continuation-in-part of U.S. patent application Ser. No. 12/916,293, titled "Resin Panels and Methods and Apparatus For Making Resin Panels," filed Oct. 29, 2010, pending, which is a continuation-in-part of U.S. patent application Ser. No. 11/726,727, titled "Methods For Applying Images to Resin Materials," filed Mar. 21, 2007, pending. The entire disclosures of the foregoing applications are, by this reference, hereby incorporated herein.

TECHNICAL FIELD

The present invention relates generally to composite resin panels with curved edges, and to methods and apparatus for making the same. More particularly, the present invention relates to methods and apparatus for making composite resin panels with shaped, curved or rounded edges, plain or patterned, at ambient temperature and pressure.

BACKGROUND OF RELATED ART

Numerous processes are currently utilized for making resin-based panels, including panels that have been formed from so-called "cultured marble" and similar materials. These panels, which are also referred to as "composite substrates," may comprise panels that are configured for interior uses. The panels may be formed with a resin matrix, such as cultured marble, and allowed to cure. Because of their strength, durability, resistance to staining and ease in cleaning, such composite substrates have become very popular for a variety of uses in the home; for example, for use as kitchen and bathroom surfaces (e.g., on walls, as counters, etc., in kitchens and bathrooms).

Resin panels are often patterned for ornamental purposes. To make a patterned resin panel, an image may be applied to a substrate with a transfer medium that has an image thereon. The image is often formed from one or more dyes capable of sublimation. In some cases, a substrate is formed and cured before a transfer medium is applied to its surface to transfer an image to that surface. A gel coating may be applied to a surface of the substrate, and the gel coating allowed to cure, before the transfer medium is applied to the surface. Then the transfer medium, which carries an image formed by sublimable ink, is brought into contact with the surface of the substrate or gel coat, and heat and/or pressure are applied to cause the image to sublimate into the substrate or gel coat. Commonly, a large and expensive heat press is employed to apply substantial heat and pressure to facilitate the image transfer. See, for example, U.S. Pat. No. 7,520,217 (Roberts et al). A protective layer of clear resin or acrylic is then applied over the pattern to protect it from ultraviolet rays that would otherwise cause the pattern to fade in sunlight.

In many instances, such as with bathroom vanity surfaces and on kitchen countertops, it is desirable to have curved or rounded edges. In the past, curved edges have been very difficult to form. If wood was used in a resin laminate, curvatures could not be achieved without dampening the wood and then applying pressure with weights and clamps for long periods. Even then the desired amount of rounding or curving was hard to achieve. In addition, water would wick into the wood members and cause undesirable swelling and warping.

SUMMARY

The present invention comprises a composite resin panel with shaped edges that are non-linear (e.g., curved, or rounded, etc.), and processes for making the same. The composite resin panel may optionally have a patterned or decorative (e.g., design-bearing, image-bearing, etc.) surface.

In various embodiments of a method for fabricating a composite resin panel with shaped edges that have curved, rounded or other non-linear profiles, a layer of liquid resin is applied to a flat surface; for example, the surface of a mold, such as a simple flat glass production table. After the resin is partially cured, a form member having a desired profile shape (e.g., curvature, etc) is aligned with and secured along an edge of the resin; for example, between the resin and an interior surface of the mold. Then a resin matrix is poured on the resin layer. After the resin layer and the resin matrix have completely cured, the form member is removed. The composite resin panel is then ready for finishing.

In embodiments where a decorative pattern, design or other image is desired, a resin layer, which may comprise a transparent or translucent material, may be applied to a flat surface, and the resin layer may be allowed to partially cure. A transfer medium bearing a transferable image, or a "printed film," is applied to the resin layer after it is partially cured, with the image-bearing surface in contact with the partially cured resin layer. During a short period (e.g., within an hour, about a half an hour, etc.), at ambient temperature and pressure, the decorative pattern, design or other image is transferred to the resin layer. The transfer medium is then removed from the resin layer. Then a protective resin matrix may be poured on the resin layer. After the resin layer and protective resin matrix have completely cured, the form member is removed and the panel is ready for finishing. The resulting panel includes a continuous decorative pattern, design or other image that extends over a flat surface of the composite resin panel and continues along the shaped (e.g., curved, etc.) profile of the edge of the fully cured composite resin panel.

The present invention also includes resin trim members with shaped (e.g., curved, rounded, other non-linear, etc.) profiles for use with a flat resin panel, and processes for making such shaped trim members. The shaped trim members may optionally have a patterned or decorative surface.

BRIEF DESCRIPTION OF THE DRAWINGS

FIGS. 1-27 are a series of drawings showing processes according to the present invention for making composite resin panels with shaped edges.

DETAILED DESCRIPTION

The present invention includes a composite resin panel with edges that have shaped profiles, or "shaped edges," and that is relatively simple and inexpensive to make. The panel and shaped edges are formed using a simple process as the resin is cured at ambient temperature and ambient pressure. Optionally, the composite resin panel with shaped edges may include a decorative pattern, design or image that is also applied during curing of the resin at ambient temperature and ambient pressure. Shaped trim members, with or without decorative patterns, designs or images, may also be formed from resin at ambient temperature and pressure.

The reasons that images transfer from a transfer medium to a resin at room temperature and at ambient pressure (i.e., without added pressure) are not fully understood. It is believed that chemical absorption of an image into the resin may occur, wherein the image on a transfer medium (e.g., a sheet, film, membrane, etc.) transfers readily to polymer molecules in a viscous or gel state because the polymer molecules are more mobile than solid state molecules. This mobility may provide a high degree of bonding between ink and polymer molecules that cannot be achieved with solid molecules in more fully cured materials, unless sublimation ink is used, accompanied by substantial heat and pressure. There could also be some diffusion of an image into the liquid or partially cured resin because of a relatively high solvent content of the resin while it remains in a gel state. In addition, the solvent content of the resin may cause a dissolving or swelling of an ink-receptive coating on the transfer medium, thus weakening that coating and facilitating image transfer to the resin. As used herein, the term "liquid resin" refers to a resin in various stages of curing from a pure liquid to a gel form and may include filler and/or reinforcement, particularly in the context of a "matrix material."

According to the present invention, image transfer is accomplished without sublimation, opening up the use of less expensive inks also providing improved lightfastness (e.g., the use of solvent- or aqueous-based pigment inkjet inks, etc.) for the patterns, designs or images. Thus, patterns, designs or images are transferred quickly and inexpensively to substrates and coatings at room temperature and ambient pressure using relatively inexpensive materials and yielding a higher quality product. Patterns, designs or images are transferred to resin that can be easily applied to any structure or surface.

Resin Panel with Curved Edges and Patterned Surface

In FIGS. 1-26, a process is shown in which a composite resin and cultured marble matrix panel is formed with one or more shaped edges. This composite panel may be used as a countertop, in numerous applications such as a bathroom vanity countertop or a kitchen countertop.

Figure 1:
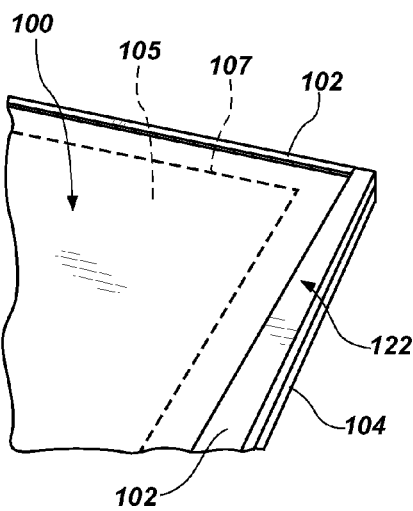

Looking first at FIG. 1, a simple flat glass production table 100 may be used as a mold. An area on the production table 100 may be laid out as a mold by affixing strips of masking tape 102 around the edges 104 of the desired area 105. In the present embodiment, a composite counter top may be formed having desired finished dimensions of 4 feet by 8 feet. Additional areas 107 may be provided about the periphery of the desired area 105 to enable the formation of shaped edges. In the current embodiment, excess areas of 6 inches along the short sides and 8 inches along the long sides are included inside the mold area 122 defined by the masking tape 102 to provide excess product for cutting into strips for banding, as discussed later.

Next a resin compound, also referred to herein as a "flow coat," may be formed by mixing a resin with a catalyst to enhance curing of the resin. The resin may be any type of resin used with cultured marble (referred to herein as "marble resin") such as an orthophthalic polyester resin. The catalyst may be any type of chemical that facilitates or promotes room temperature curing of the resin, such as methyl ethyl keytone peroxide (MEKP) initiators. Typically the flow coat may be clear to allow the display of a subsequently applied decorative pattern, design or image. If no pattern, design or image will be applied later, then the flow coat may include a pigment of any desired color, including white. The flow coat may be also formed from materials that are ultra-violet (UV) protective, so UV rays will not damage any pattern, design or image beneath the flow coat, or cause any pattern, design or image to fade over time.

Figure 2:
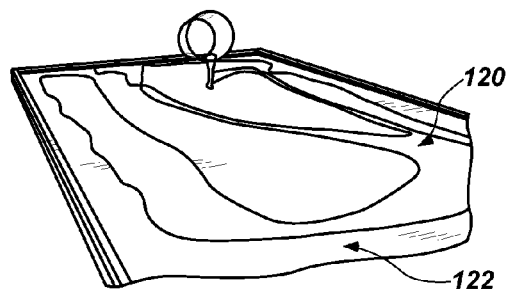
Figure 3:
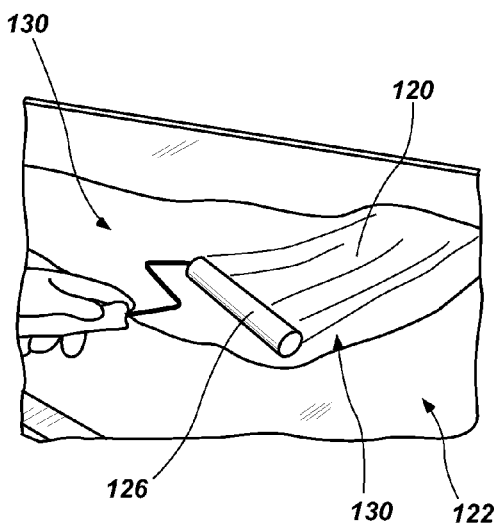

As shown in FIG. 2, a flow coat 120 may be poured in the mold area 122 of the production table 102. Referring to FIG. 3, a metal roller 126, blade (e.g., doctor blade, squeegee, etc.) or other means for spreading may be used to spread the flow coat 120 evenly over the mold area 122 to form a resin layer that is referred to herein as a "top coat" 130. In the current embodiment, the top coat 130 may be 35 to 40 mils, or less than about 1/16 inch, thick.

Figure 4:
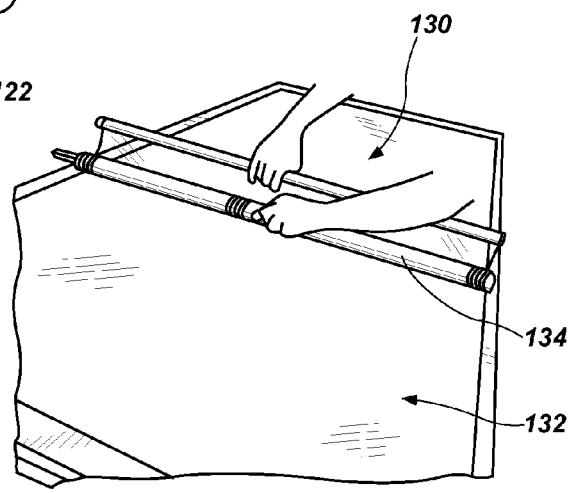
Figure 5:
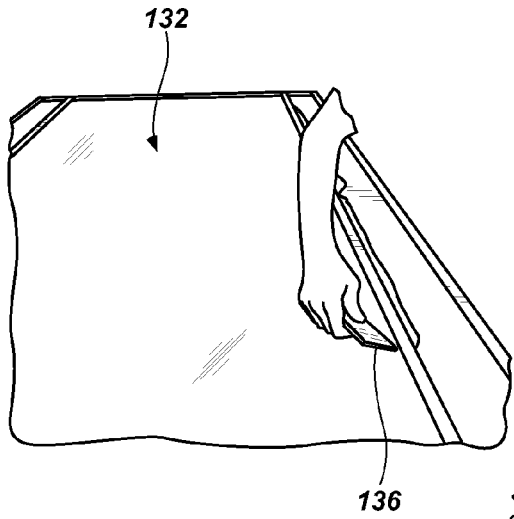

Next, the top coat 130 may be allowed to partially gel; for example, for about 7 minutes to about 10 minutes. Then, as shown in FIG. 4, a printed film 132, which is an embodiment of a transfer medium, may be rolled out with the pattern, design or image thereof facing and contacting the partially gelled top coat 130. The printed film 132 may be rolled or pressed flat against the top coat 130 with a fiber roller 134 to smooth out the printed film 132. As shown in FIG. 5, a squeegee 136 or any other suitable means may be used to remove any air bubbles trapped under the printed film 132 and to ensure that it contacts the partially gelled top coat 130 (FIGS. 3 and 4).

Figure 6:
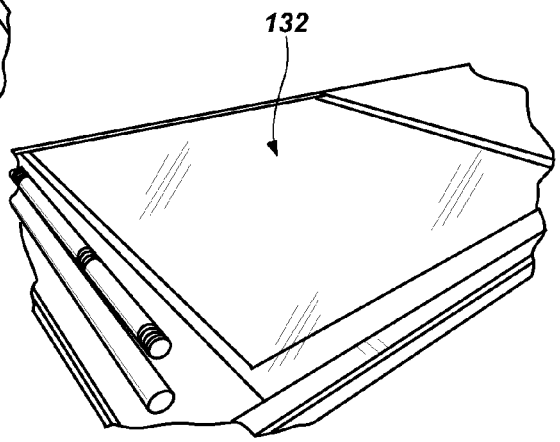

As seen in FIG. 6, the printed film 132 is left in contact with the top coat 130 (FIGS. 3 and 4) long enough for the pattern, design or image 212 (FIG. 7) to transfer to the top coat 130. In the present embodiment, the contact time may be about 30 to 60 minutes. During that time, the top coat 130 and the printed film 132 remain at ambient temperature and pressure. There is no need for a heated and/or pressurized press to transfer the pattern, design or image 212 from the printed film 132 to the partially gelled top coat 130.

The printed film 132 comprises a transfer medium having a pattern, design or image 212, thereon that may be acquired from various means, such as a photograph or painting, and may be scanned into a computer for editing. The computer may then print the image on a transfer sheet or film employing various inks that are susceptible to being transferred to resins. An optional receptive coating 133 (FIG. 8) of the printed film 132 (e.g., on the transfer medium, etc.) may enhance transfer of the pattern, design or image 212 from the printed film 132 to the top coat 130.

Figure 7:
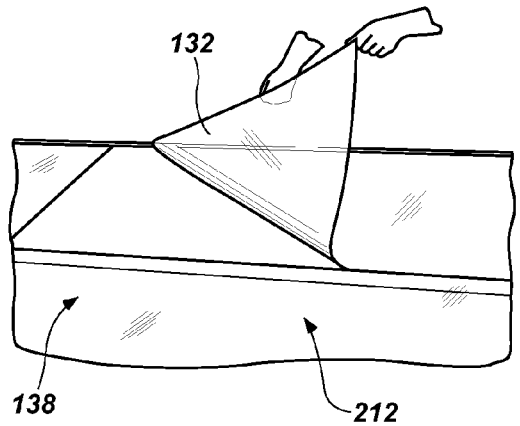
Figure 8:
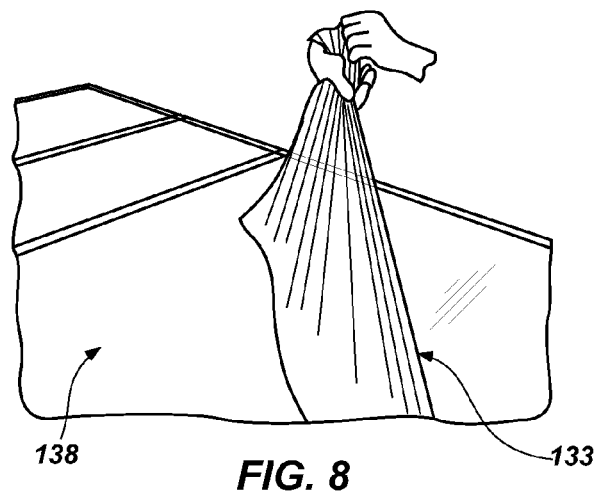

Referring next to FIG. 7, after the transfer time has ended, the printed film 132 is carefully peeled away from the top coat 130, leaving the pattern, design or image 212 on the top coat 130 to form a patterned top coat 138. Looking at FIG. 8, to the extent that the receptive coating 133 does not come off with the remainder of the printed film 132, it can be separately removed from the patterned top coat 138. Care should be taken to not scratch the pattern, design or image 212 in the process of removing any part of the receptive coating 133 that has been released with the pattern, design or image 212.

Next, before the partially gelled patterned top coat 138 has cured, a shaped edge of the patterned top coat 138 may be formed. In FIG. 9, an elongated bar 140 (an embodiment of a form member having a desired profile shape) is shown with a curved side 142 of the bar 140 having a concave curvature in a radius profile extending along the length of the bar 140. The radius of the curved side 142 may be about ¾ inches. The bar 140 may be made of aluminum or any other suitable material. The other sides 144 (FIG. 11) of the bar 140 may comprise planar surfaces oriented at angles of 90 degrees to one another.

Next referring to FIG. 10, one or more edges (e.g., front edge 150, as illustrated) of the patterned top coat 138 may be pulled away from the production table 100 (FIG. 1), and the bar 140 may be pushed under the front edge 150 with the curved side 142 adjacent to the front edge 150 of the patterned top coat 138, causing the front edge 150 of the patterned top coat 138 to conform to the curvature of the curved side 142 of the bar 140. The front edge 150 may ultimately form at least part of a shaped edge of the composite resin panel, such as the front of a vanity counter.

As shown in FIG. 11, double-sided tape 154 may be applied to a non-curved side 144 of the bar 140 to secure the curved side 142 (FIGS. 9 and 10) of the metal bar 140 in place relative to the production table 100 (FIG. 1), beneath the front edge 150 (FIG. 10) of the patterned top coat 138 (FIG. 10). Looking at FIG. 12, an additional strip 156 of the double-sided tape 154 (FIG. 11) may be also applied to the back side 146 of the bar 140 to secure bar 140 to the production table 100 (FIG. 1).

Figure 13:
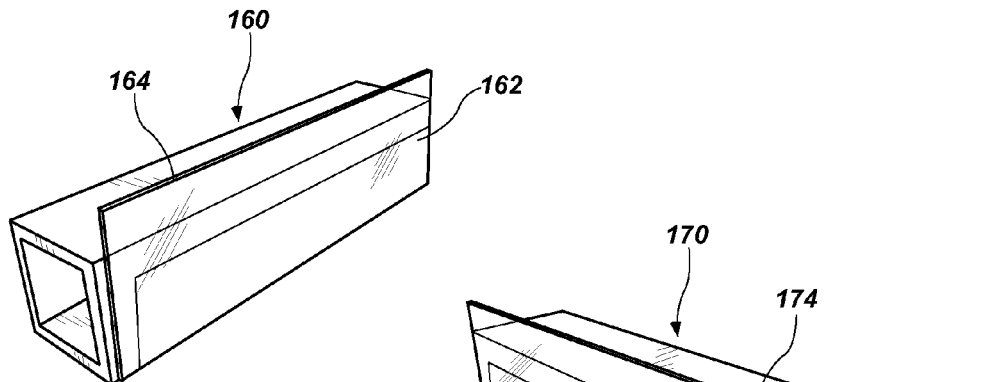
Figure 14:
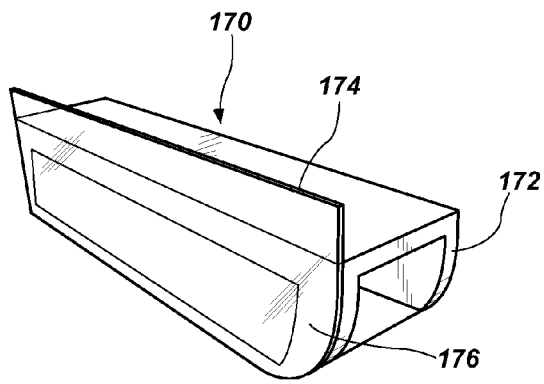
Figure 15:
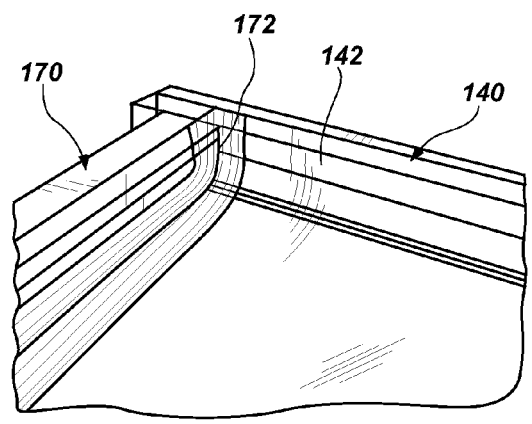

In FIG. 13, a non-curved metal bar 160 is shown having a straight side 162 with a patterned resin banding 164 attached to the straight side 162. Another bar 170 is shown in FIG. 14, having a radius end 172 with a curvature to match the curved side 142 of bar 140 (FIGS. 9 and 10). A patterned resin banding 174 may be secured (e.g., taped, etc.) to a non-curved side 176 of bar 170. The patterned resin bandings 164 and 174, or strips, may be each be made from an otherwise unused area of patterned top coat 138 that has been cut into a strip (e.g., 4 by 1 inch, etc.) from an excess area of the patterned top coat 138 (FIG. 8), such as described in reference to FIG. 1. FIG. 15 shows the bar 170 with its radius end 172 abutting the curved side 142 of bar 140.

Figure 16:
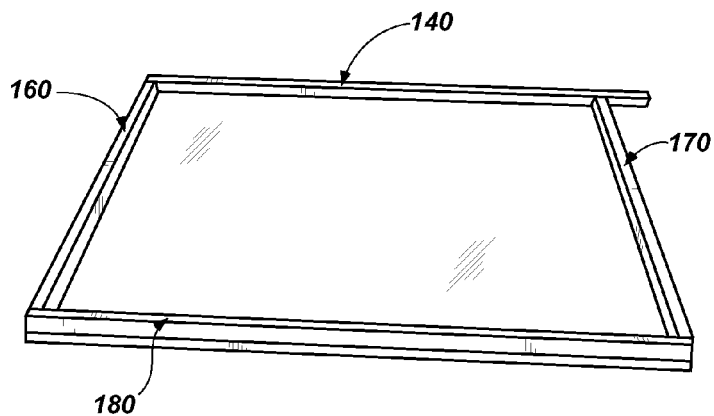

FIGS. 15 and 16 show the bar 140 having its curved side 142 abutting the radius end 172 of the bar 170 at a right angle, as well as another bar 180, identical to bar 170 and having a radius end (not shown) identical to radius end 172 of bar 170, oriented perpendicularly to and abutting bar 140. The non-curved metal bar 160 shown in FIG. 13 may be oriented at right angles to the non-radius ends of bars 170 and 180 and assembled therewith in abutting relation. Assembled together, the bars 140, 160, 170 and 180 define the actual dimensions of the panel (e.g., a counter top, etc.) being formed.

Alternatively, one or more additional edges of patterned top coat 138 (FIG. 8) may also be rolled up using additional bars having shaped sides, similar to the curved side 142 of bar 140 (FIGS. 9 and 10). Accordingly, any additional or all edges of the top coat 138 may be lifted from the production table 100 (FIG. 1) and shaped, depending on the number of curved edges desired for the panel (e.g., a countertop, etc.).

Figure 17:
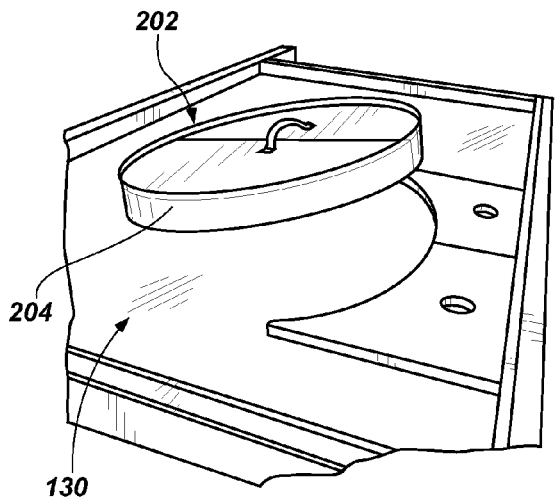

In the event that the panel is intended to be a vanity countertop including an under mount sink, and for a variety of other purposes, an opening may be required. In such case, as shown in FIG. 17, a plug mold 202 (e.g., an oval plug mold, a circular plug mold, etc.) may be placed on the patterned top coat 138 (FIG. 8) to form a hole (e.g., an under mount sink hole, etc.). Patterned resin banding 204 may be positioned around the periphery of the plug mold 202, as shown. Alternatively, if an opening with a shaped edge is not needed (e.g., an opening or hole for a drop-in bowl, etc.) is to be formed (e.g., for a vanity counter top, etc.) then the plug mold 202 is not needed, and a hole may be cut through the panel at the time of installation.

Figure 18:
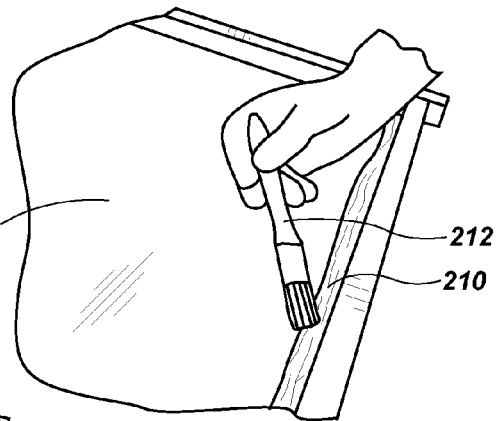

Now looking at FIG. 18, a second resin compound 210 may be applied (e.g., by a brush 212, a roller, etc.) to all the joints of the patterned top coat 138 and any patterned resin bandings 164 (FIG. 13), 174 (FIG. 14), 204 (FIG. 17) to seal against leakage. The second resin compound 210 may be a mixture of flow coat and fumed silica, such as that sold as CAB-O-CIL® by Cabot Corporation, mixed to the consistency of thin putty. The patterned top coat 138 (FIG. 8) may be left to gel or may be further worked as described below.

Figure 19:
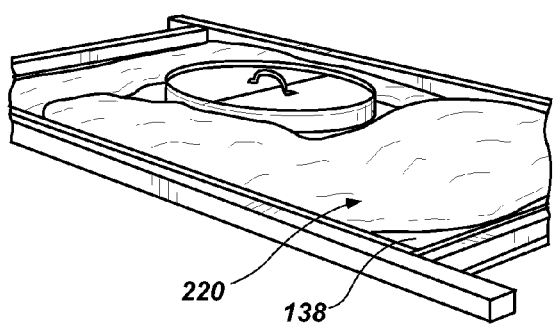
Figure 20:
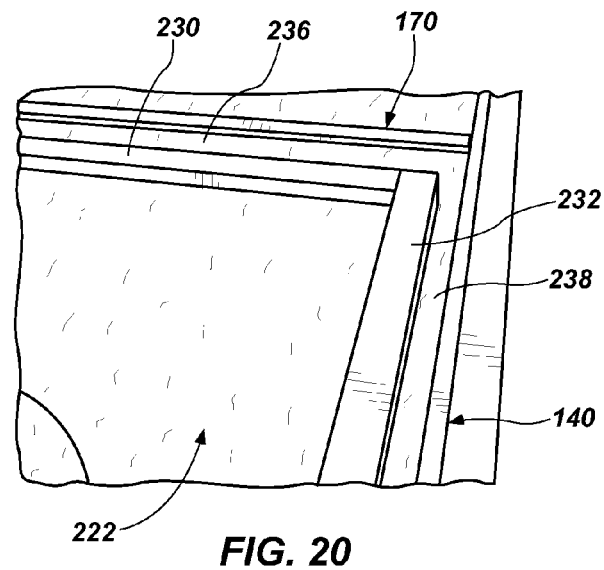

Next, as shown in FIG. 19, a matrix 220 material (e.g., a cultured marble, another resin-based material, etc.) may be applied to (e.g., poured over, etc.) the patterned top coat 138 within the borders of the bars 140, 160, 170 and 180 to form a support layer 222 for the resin panel shown in FIG. 20. In the current embodiment, the matrix 220 material may comprise a cultured marble material that consists of 27% high strength polyester resin, 73% marble filler (such as limestone and organic peroxide) and a catalyst (approximately 1% ratio to resin amount by weight). Pigment may be added to obtain a desired color. For example, titanium dioxide may be added to achieve a white color. The matrix 220 material may be poured and spread in a support layer 222 having a consistent thickness of ½ inch. This support layer 222 may be left to cure for about 20 minutes to about 30 minutes.

As an option, after the material of the matrix 220 has partially gelled, an additional thickness of matrix material may be added at strategic locations at the edges, or periphery, of the support layer 222 to give the entire panel the appearance of having a thickness than exceeds the actual thickness of the majority of the panel. For example, a layer having an additional ⅝ inch thickness may be added at the edges of a ½ inch thick panel to make the counter top appear to be P/8 inches thick rather than ½ inch thick.

This process of enhancing the thickness of the periphery of a panel is shown in FIGS. 20 to 26. Looking at FIG. 20, bar molds 230 and 232 may be secured to the support layer 222 parallel with, but spaced apart from, one or more of the bars 140, 170, respectively, so as to leave troughs 236, 238 between each bar mold 230, 232 and its respective bar 140, 170. Each trough 236, 238 may be about ½ to ¾ inches wide. Each bar mold 230, 232 may be made of a plastic, such as polyethylene, with a thickness of about ⅝ inch. In some embodiments, each bar mold 230, 232 may have and a width of about 1⅛ inch. An adhesive element (e.g., a double-sided tape, etc.) may secure the bar molds 230, 232 to the support layer 222.

Figure 21:
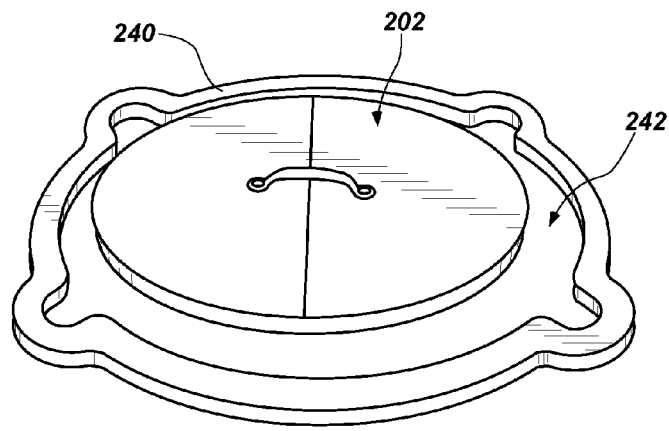

Similarly, as shown in FIG. 21, an interior bar mold 240 (e.g., an oval bar mold, etc.) may be assembled around the plug mold 202. The interior bar mold 240 may be spaced apart from the plug mold 202 to form a trough 242 between the interior bar mold 240 and the plug mold 202. In some embodiments, the trough 242 may have a thickness of about ½ inch to about ¾ inches.

Figure 22:
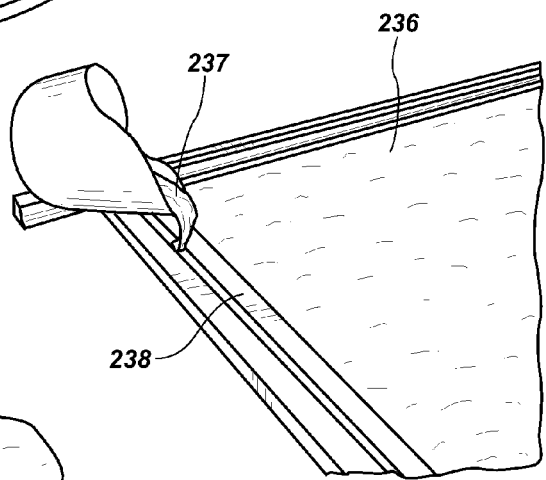
Figure 23:
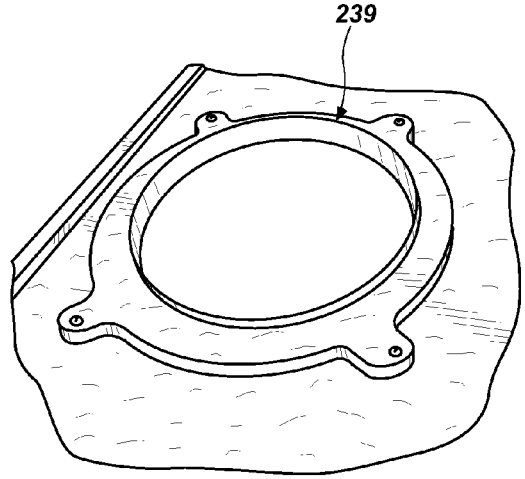

As shown in FIG. 22, additional matrix material may be poured into each trough 236, 238 and fill that trough 236, 238 to the top of the corresponding bar mold 230, 232 (FIG. 20) to define a matrix 237. Likewise, as seen in FIG. 23, additional matrix 239 material may be poured into the shaped trough 242 formed between the interior bar mold 240 (FIG. 21) and the plug mold 202. After the matrices 237, 239 have cured, each bar mold 230, 232 (FIG. 20) and the interior bar mold 240 (FIG. 21) are removed. The bars 140, 160, 170, 180 are also removed. The panel (e.g., a countertop, etc.) may be then removed from the production table 100 (FIG. 1).

Figure 24:
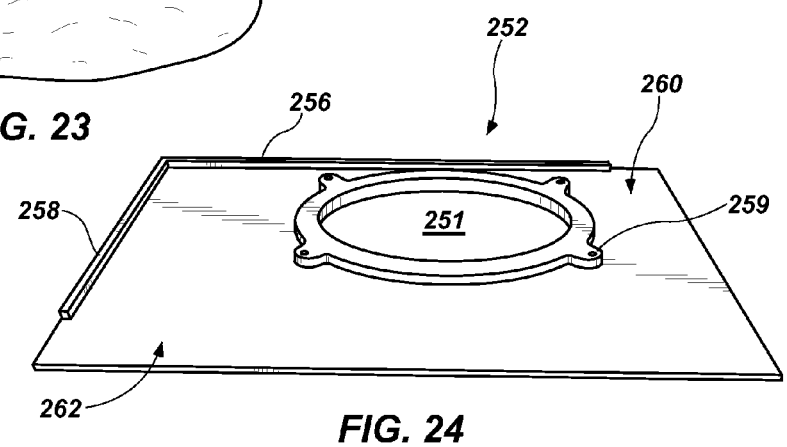
Figure 25:
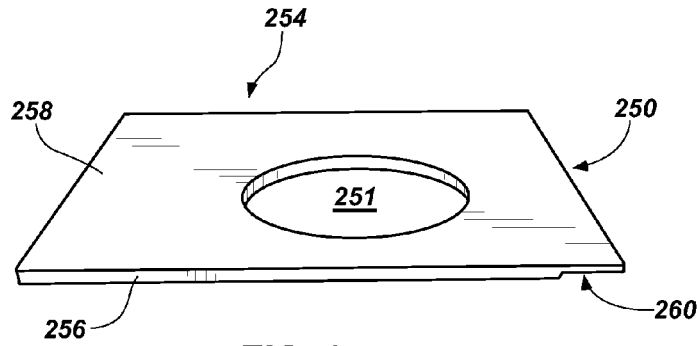
Figure 26:
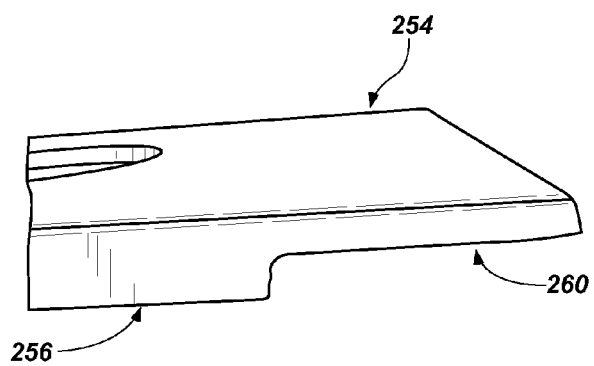

FIGS. 24 to 26 show the underside 252 and topside 254, respectively, of a finished countertop 250. The process described in FIGS. 20 to 26 provides enhanced thickness matrix sections 256, 258 along the two edges of the countertop 250 where the bar molds 230, 232 (FIG. 20) were placed, giving an appearance that the countertop 250 is thicker throughout than it actually is. An enhanced thickness section 259 has also been formed around an opening 251.

In embodiments where the bar molds 230, 232 (FIG. 20) are ⅝ inch thick, and were placed on a ½ inch thick matrix layer, the enhanced thickness matrix sections 256, 258 impart the periphery of the finished countertop 250 with a thickness of 1⅛ inches. Additional bar molds may be placed at one or more additional edges to give the appearance of enhanced thickness at each such edge.

As seen in FIGS. 24 to 26, sections 260 and 262 of the countertop 250 on the same sides as sections 256, 258, respectively, do not have an enhanced thickness, since the bar molds 230, 232 (FIG. 20) did not extend that far along the surface of the support layer 222. On installation of the countertop 250, sections 260, 262 may be cut from the countertop 250 and used as splashes (e.g., a back splash, side splashes, etc.) that may be adhered to walls adjacent to the countertop 250, providing continuity from the pattern, design or image of the countertop 250 to the pattern, design or image of each adjacent splash.

Figure 27:
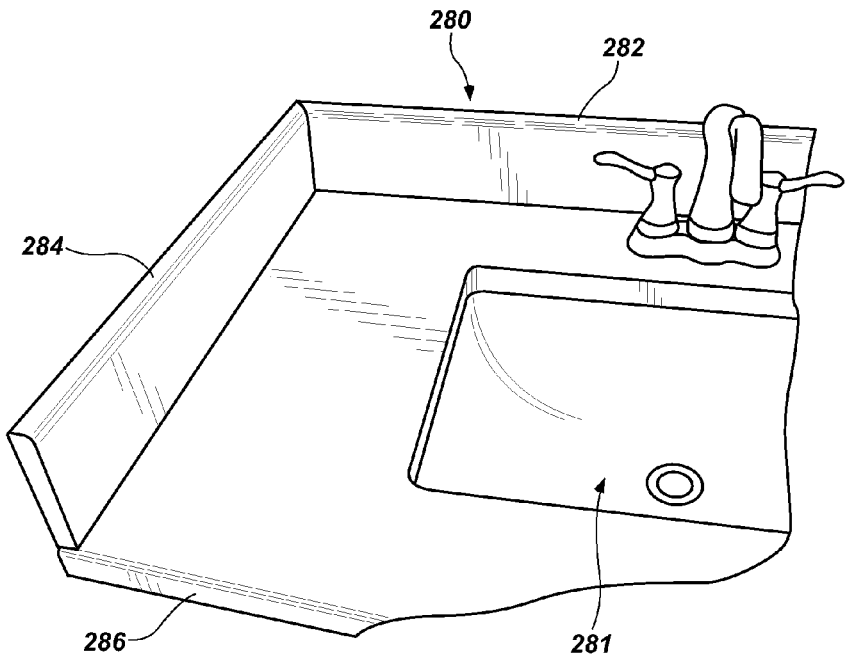

FIG. 27 shows a countertop 280 having a rectangular sink mount 281 installed with a back splash 282 and side splash 284 for the vanity countertop that are of the same material and pattern, design or image as the vanity counter top, creating an integrated, pleasing appearance of the counter top with other adjacent surfaces. The remaining enhanced thickness sections 286 and 288 (not shown) add ⅝ inch thickness around the visible sections of the countertop 280, giving it an overall appearance of being 1⅛ inches thick, rather than ½ inch thick.

It should be understood that the countertop described above can be made without a pattern, design or image in or on its top coat. In that case, the top coat may be pigmented for cosmetic reasons. The countertops formed according the described process can be used for vanity counter tops with sinks, as described. These countertops can also be used to form other counter surfaces, including, without limitation, kitchen counters, free standing counters, desktops, and in various other applications where composite panels may be utilized. Different dimensions may be used, depending upon the dimensions that are desired.

Resin Trim and Curb Components

Resin panels, such as countertops, are often accompanied by trim and curbs, which enable the installer to provide the installed product with a more finished or polished appearance. It may be desirable to have trim and curb components patterned in the same manner as the counter tops or other panels with which such components are used. The processes shown in FIGS. 28 to 42 and described below may be used to make such trim and curb components.

The process for making both trim and curb components starts out the same way as described above for making a resin-marble composite counter top. The same process may be carried out as shown in and described with reference to FIGS. 1 to 8, resulting in a patterned, partially gelled patterned top coat 138 laid out on a production table 100 (FIG. 1), as shown in FIG. 28.

Figure 28:
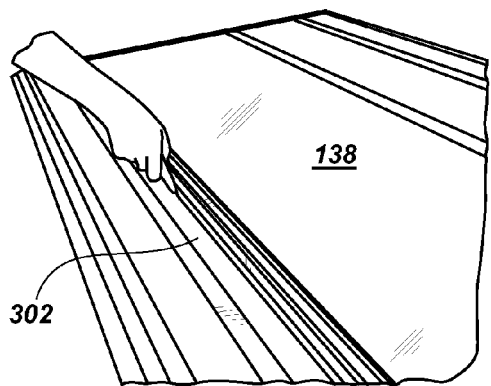
FIGS. 28-33 are a series of drawings showing processes according to the present invention for making composite resin shaped trim members.
Figure 29:
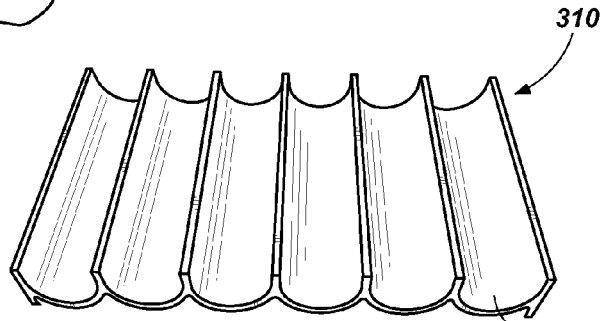
Figure 30:
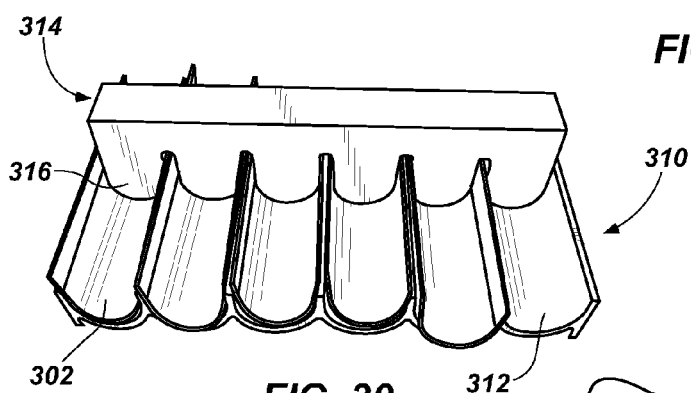
Figure 31:
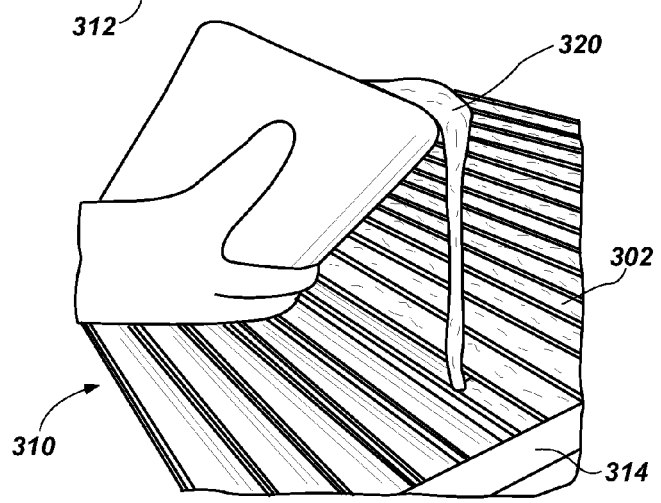

To make trim components, the patterned top coat 138, while still malleable, may be cut into strips 302 (e.g., strips having a width of about 2½ inches, etc.), as shown in FIG. 28. A trim mold 310, an embodiment of which is shown in FIG. 29, may have multiple channels 312 shaped to a desired form for the trim components. Portions of the strips 302 may be forced down into the channels 312 of the trim mold 310, as shown in FIG. 30. A stop 314, which may be placed at one end of the trim mold 310 to stop the flow of matrix material, may have curved portions 316 that conform to the curvatures of the channels 312. Looking at FIG. 31, with the stops 314 in place, a matrix 320 material may then be poured into the trim mold 310, over the top of strips 302, and allowed to set up.

Figure 32:
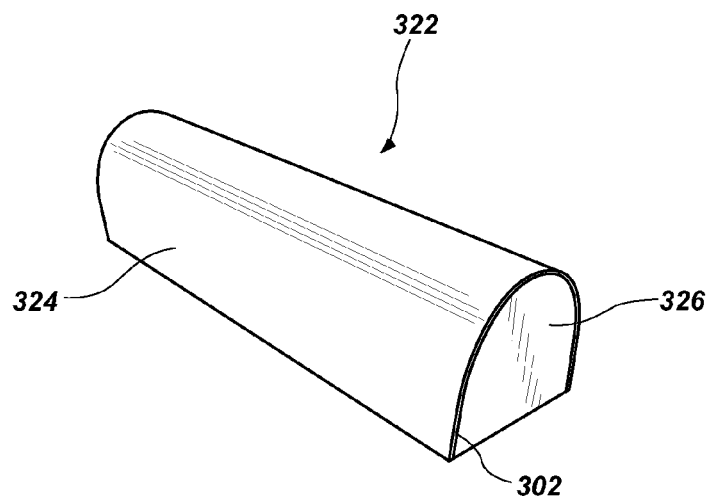
Figure 33:
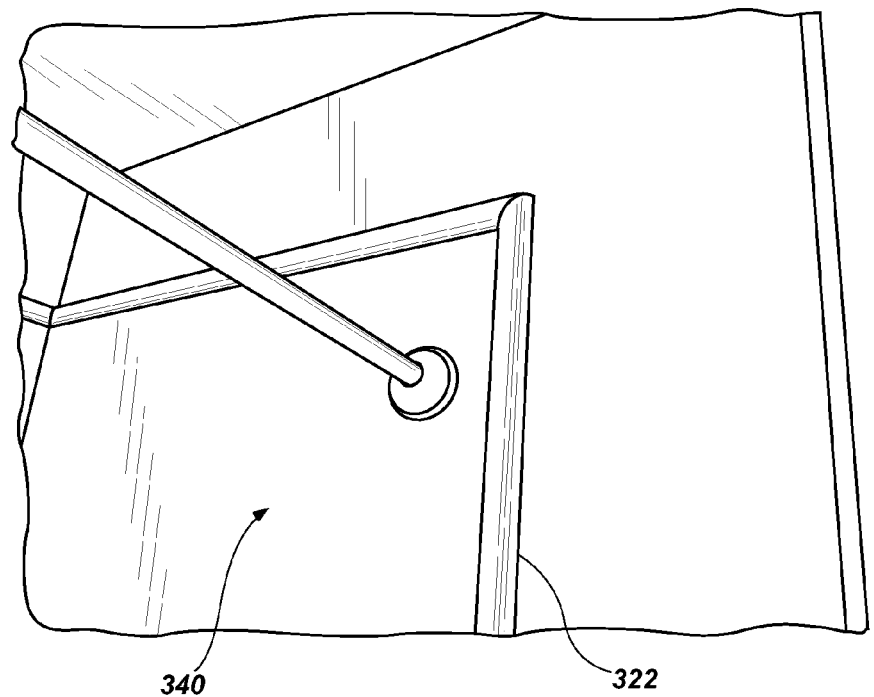

An embodiment of a finished trim component 322 is shown in FIG. 32. A patterned strip 302 forms an outer curved surface 324 of the trim component 322, covering the hardened matrix 326 of the trim component 322. As seen in FIG. 33, the trim component 322 may be used around the edges of a composite resin panel 340, such as for a shower wall.

It is sometimes desirable to make curb components having curved edges for a variety of uses. Such curbs may be about 4 inches wide to about 6 inches wide, and may be used to cover joints between adjacent panels or as an entry member for showers.

Figure 34:
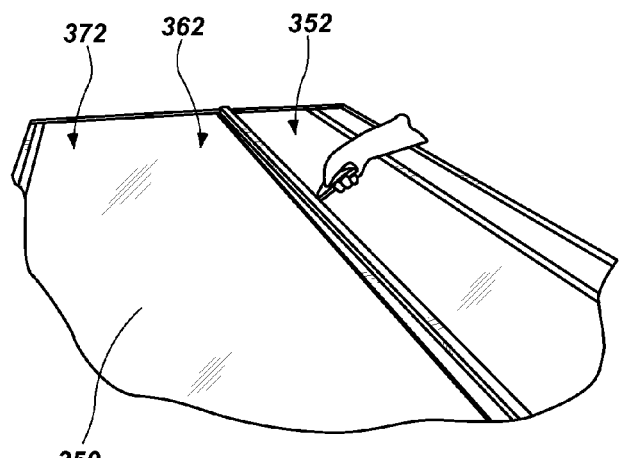
FIGS. 34-43 are a series of drawings showing processes according to the present invention for making curb components with shaped edges.
Figure 35:
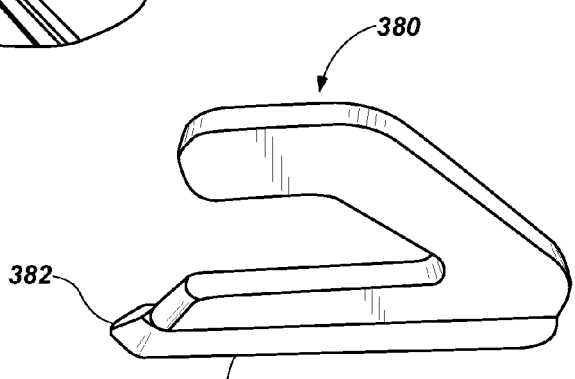
Figure 36:
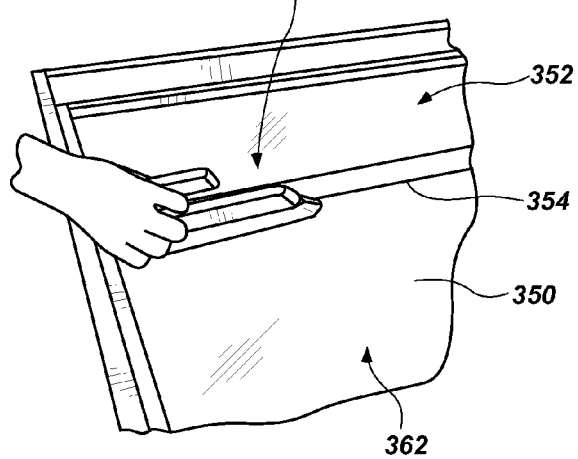

To make curbs having curved edges, the same patterned partially-gelled top coat shown in FIGS. 28 and 34 may be used. Looking at FIG. 34, a patterned top coat 350 may be cut into adjacent strips 352, 362 and 372. Next, as seen in FIGS. 35 and 36, a tool 380 with a base 384 and a point 382 at the front of the base 384 may be used by inserting the base 384 and the point 382 into a cut 354 in the patterned top coat 350, between adjacent strips 352 and 362. This action by tool 380 may cause the edges of adjacent strips (e.g., adjacent strips 352, 362) to roll up, as seen hereafter.

Figure 37:
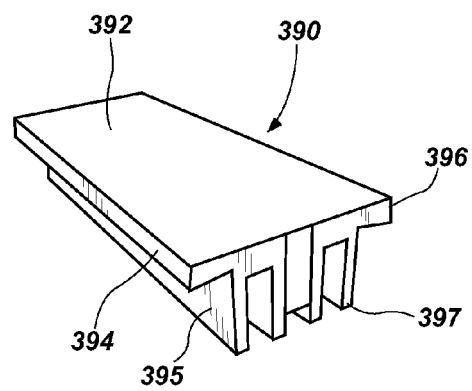
Figure 38:
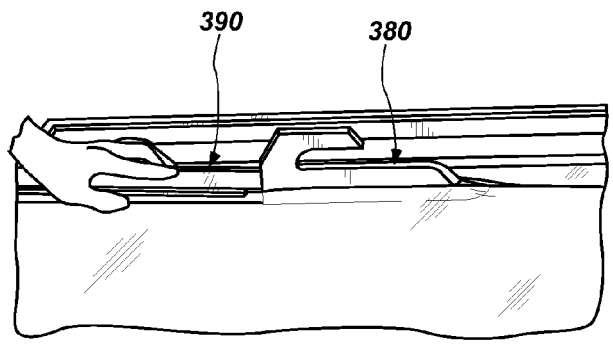

Next, looking at FIG. 37, a T-channel form 390 is shown having an elongated top piece 392 with a side edge 394 extending laterally beyond, or overhanging, an elongated vertical surface 395, which extends from a bottom surface of the elongated top piece 392. An opposite side edge 396 of the elongated top piece 392 extends laterally beyond, or overhangs another elongated vertical surface 397, which also extends from a bottom surface of the elongated top piece 392, parallel to the elongated vertical surface 395. As shown in FIG. 38, the vertical element of the T-channel form 390 may be inserted into a cut 357 (not shown) between adjacent strips 352 and 362 (FIG. 36), directly behind the tool 380.

Figure 39:
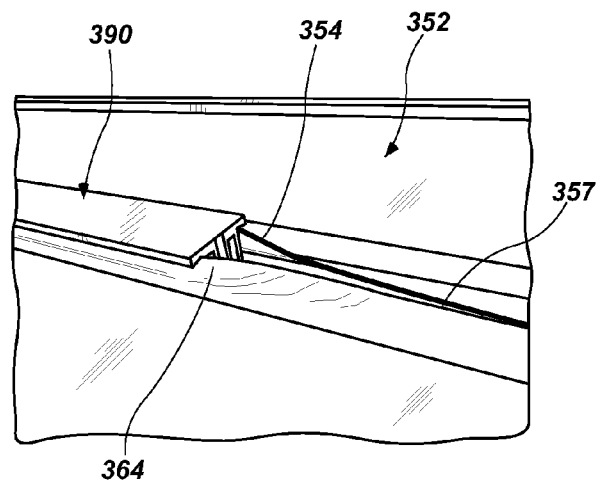
Figure 40:
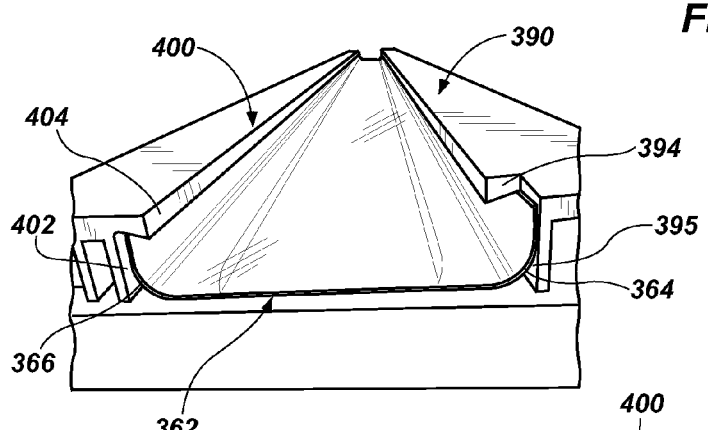

As seen in FIGS. 39 and 40, as the T-channel form 390 is inserted in the cut 357, an edge 354 of strip 352 may roll up along the elongated vertical surface 397 (FIG. 37) of the T-channel form 390, and abut against the opposite side edge 396 (FIG. 37) of the T-channel form 390. The T-channel 390 may also cause an edge 364 of strip 362 to roll up along the elongated vertical surface 395 of the T-channel form 390, and to abut against the side edge 394 of the T-channel form 390. FIG. 40 also shows another T-channel form 400 inserted in the cut (not shown) between strips 362 and 372, so as to cause an edge 366 of strip 362 to roll up against a vertical surface 402 and to abut against an edge 404 of the T-channel form 400.

Figure 41:
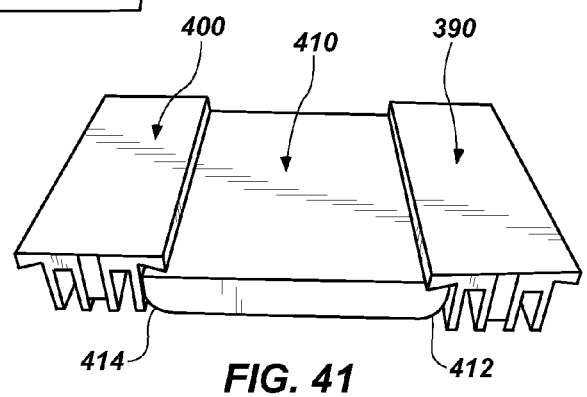
Figure 42:
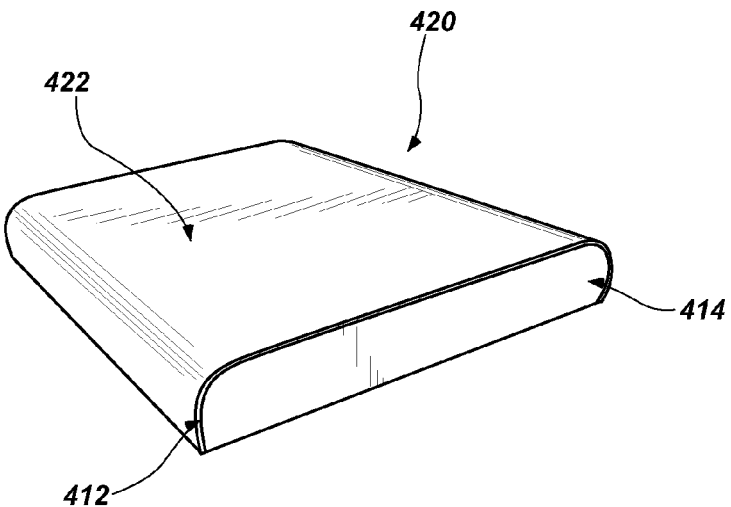
Figure 43:
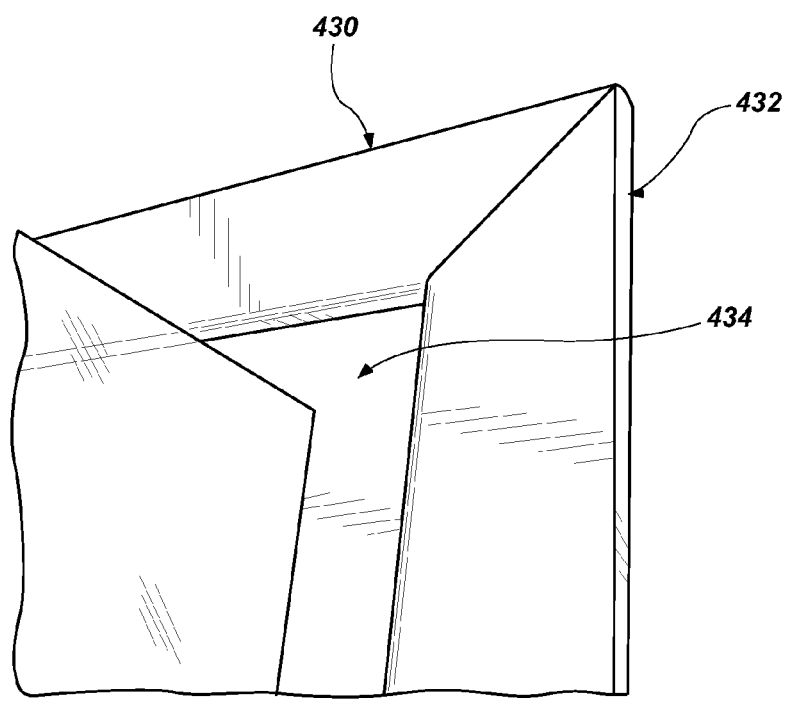

Next, as seen in FIG. 41, a matrix 410 material (e.g., cultured marble, another resin-based material, etc.) may be poured in the opening formed by the strip 362 (not shown) and between the T-channel forms 390 and 400. The matrix 410 assumes the curvature of curved edges 412 and 414 conforming to the curved edges 364 and 366 of the strip 362 (not shown). The material that forms the matrix 410 may be allowed to cure and may be then removed from contact with T-channel forms 390 and 400. As seen in FIG. 42, the end product is a curb component 420 having a patterned resin surface 422 and curved edges 412 and 414. FIG. 43 shows an application for curb components 430 and 432 as finish pieces around the periphery of a shower wall 434.

Advantages and Applications

From the foregoing description, the advantages of the various embodiments of the present invention can be seen. The use of molds providing the edges of composite resin panels and components with shaped profiles substantially reduces manufacturing time over prior art processes. The time-consuming processes required to form wood laminate panels and countertops are eliminated.

Moreover, the molds provide a more attractive finish by showing continuity in pattern around shaped surfaces, on banding and on attached splashes. In addition the amount of resin needed for a panel may be substantially reduced by forming edges of enhanced thickness to give the panel the appearance of being thicker throughout than it actually is. Consequently, less resin is needed, and the resulting products are lighter than prior art panels.

Further by using only a composite resin to make the panels according to the present invention, there is no difficulty in forming panels with any desired edge profile, so that the difficulties experienced with prior art wood laminate members requiring clamping and using weights for curvatures, as well as undesirable wood wicking and warping, are eliminated.

In addition, panel embodiments are provided enabling the transfer of patterns, images, designs, shapes and/or color to resin panels or trims at ambient temperature and ambient pressure, eliminating the need for expensive heated presses.

Moreover, expensive sublimation inks and their associated specialty coated receptive materials are not needed. Instead, inexpensive solvent- or aqueous-based ink may be used to apply images to generic, inexpensive transfer media. If pigmented inks are chosen, the need for UV resistant coatings is mitigated, thus reducing the number of requirements placed on the protective overcoat. If dye-based inks are chosen, UV resistant materials may be incorporated into the protective overcoat as the application allows. In either case, the protective overcoat provides oxidation protection to the image, along with improved aesthetics.

Moreover, the number of manufacturing steps and the time required for making prior art imaged structures are substantially reduced, since the imaging and curing processes may be simultaneously carried out. In addition, the manufacture of thin patterned, designed or imaged resin layers opens up many additional applications to many natural and man-made materials.

Many applications are available for the present invention. For example, in homes, the panel materials may be used for kitchen and bathroom surfaces, such as countertops, vanity tops, sinks, bathtubs, showers, tub splashes, walls, and the like.

It should be understood that composite resin panels, trim components and curb components can be made according to the present invention without applying patterns, designs or images to any of the surfaces. Also composite resin panels, trim components and curb components may be made having different sizes, shapes and curvature than that shown in the foregoing description.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as examples only, with the present invention being defined by the claims and their equivalents.

What is claimed:

1. A process for making a composite resin panel having a shaped edge, comprising:
    providing a raised periphery around a flat surface to define a flat mold having a desired area;
    then applying a liquid resin to the flat surface of the flat mold and spreading the liquid resin over the flat surface;
    then allowing the liquid resin to partially cure to form a layer of resin;
    then moving at least one peripheral portion of the layer of resin, which includes resin that is partially cured but not fully cured, away from the flat surface;
    then positioning an edge mold on the flat surface, the edge mold including a shaped mold surface;
    then applying the at least one peripheral portion of the layer of resin to or adjacent to the shaped mold surface of the edge mold to cause the at least one peripheral portion of the layer of resin to conform to a shape of the shaped mold surface;
    applying a matrix material to the layer of resin; and
    curing the matrix material and the layer of resin to form an integral composite resin panel.

2. The process of claim 1, wherein curing the matrix material and the layer of resin comprises curing the matrix material and the layer of resin in an environment with an ambient temperature and an ambient pressure.

3. The process of claim 1, wherein applying the at least one peripheral portion of the layer of resin to or adjacent to the shaped mold surface comprises positioning the at least one peripheral portion to or adjacent to a shaped side of an elongated bar.

4. The process of claim 1, further comprising:
    applying a second mold to or adjacent to the layer of resin to define an area for receiving a matrix material in an at least partially uncured state;
    applying the matrix material to the layer of resin; and
    allowing the matrix material to partially cure.

5. The process of claim 4, further comprising:
    applying a third mold to the matrix material after the matrix material is partially cured, but not fully cured, with the third mold being oriented parallel to and spaced apart from an edge of the first mold or an edge of the second mold to define a trough.

6. The process of claim 5, further comprising:
    introducing additional matrix material into the trough and onto a portion of the matrix material exposed to the trough.

7. The process of claim 1, further comprising:
    applying a transfer medium with a pattern, design or image on a surface thereof to the layer of resin after allowing resin of the layer of resin to partially cure, but before the resin has fully cured, with the pattern, design or image in contact with the resin;
    further curing the partially cured resin in an environment with an ambient temperature and an ambient pressure to transfer the pattern, design or image from the transfer medium to the layer of resin before the resin has fully cured; and
    removing the transfer medium from the layer of resin before the resin has fully cured and before applying the matrix material to the layer of resin.

8. The process of claim 7, wherein allowing the layer of resin to partially cure, further curing the partially cured resin and curing the matrix material and the layer of resin are effected in an environment with an ambient temperature.

9. The process of claim 7, wherein allowing the layer of resin to partially cure, further curing the partially cured resin and curing the matrix material and the layer of resin are effected in an environment with an ambient pressure.

10. The process of claim 7, further comprising:
    applying a second mold adjacent to the layer of resin to at least partially define an area to which the matrix material is to be applied.

11. The process of claim 10, wherein applying the second mold comprises applying a second mold along with a patterned resin strip along at least one mold surface of the second mold, the patterned resin strip having a pattern, design or image similar to the pattern, design or image on the layer of resin.

12. The process of claim 1, wherein applying the liquid resin comprises applying a marble resin.

13. A process for making a patterned resin panel having a shaped edge, comprising:
providing a raised periphery around a flat surface to define a flat mold having a desired area;
then applying an uncured resin to the flat surface and spreading the uncured resin over the flat surface to form a layer of resin;
then allowing resin of the layer of resin to partially cure;
then moving an edge portion of the layer of resin, which includes resin that is partially cured but not fully cured, away from the flat surface;
then placing a shaped mold on the flat surface, adjacent to the raised periphery;
then applying the edge portion of the layer of resin to the shaped mold to cause the edge portion of the layer of resin to conform to a shape of the shaped mold;
applying a pattern, a design or an image to the layer of resin while the edge portion of the layer of resin conforms to the shape of the shaped mold, with the pattern, design or image being in contact with the layer of resin;
further curing the layer of resin to transfer the pattern, the design or the image from a transfer medium carrying the pattern, the design or the image to the layer of resin; and
removing the transfer medium from the layer of resin before the resin has fully cured, the pattern, the design or the image remaining with the layer of resin.

14. The process of claim 13, wherein placing the shaped mold on the flat surface comprises placing an elongated bar on the flat surface and wherein applying the edge portion of the layer of resin to the shaped mold comprises applying the edge portion of the layer of resin to a shaped side of the elongated bar.

15. The process of claim 13, further comprising:
applying at least a second mold to the layer of resin before the resin is fully cured to at least partially define an area for a matrix material to be applied.

16. The process of claim 15, further comprising:
applying the matrix material to the layer of resin before the resin is fully cured; and
curing the matrix material and the resin to form an integral composite resin panel.

17. The process of claim 15, further comprising:
applying a third mold to the matrix material, adjacent to but spaced apart from the first mold or the second mold to define a trough.

18. The process of claim 17, further comprising:
introducing additional matrix material into the trough and onto the matrix material exposed to the trough.

19. The process of claim 13, wherein applying the pattern, the design or the image comprises applying a transfer medium comprising a flat sheet carrying the pattern, the design or the image.

20. A process for making a composite resin panel having a shaped edge, comprising:
providing a raised periphery around a flat surface to define a flat mold having a desired area;
then applying a liquid resin to the flat surface of the flat mold and spreading the liquid resin over the flat surface;
then allowing the liquid resin to partially cure to form a layer of resin;
then moving an edge portion of the layer of resin, which has partially cured but not fully cured, away from the flat surface;
then placing a shaped mold including an elongated, shaped mold surface on the flat surface, adjacent to the raised periphery;
then applying the edge portion of the layer of resin adjacent to the elongated, shaped mold surface to cause the edge portion of the layer of resin to conform to a shape of the shaped mold surface;
applying a second mold to or adjacent to the layer of resin to define an area for receiving a matrix material in an at least partially uncured state;
applying a matrix material to the layer of resin;
curing the matrix material and the layer of resin in an environment with an ambient temperature and an ambient pressure to form an integral composite resin panel;
applying a third mold to the matrix material after the matrix material is partially cured, but not fully cured, with the third mold being oriented parallel to and spaced apart from an edge of the first mold or an edge of the second mold to define a trough; and
introducing additional matrix material into the trough and onto a portion of the matrix material exposed to the trough.

21. A process for making a composite resin panel having a curved edge, comprising:
providing a raised periphery around a flat surface to define a flat mold having a desired area;
then applying a liquid resin to the flat surface of the flat mold;
then allowing the liquid resin to partially cure to form a layer of resin;
then moving an edge portion of the layer of resin adjacent to the shaped mold to cause the edge portion of the layer of resin to conform to a shape of the shaped mold;
then placing the shaped mold on the flat surface, adjacent to the raised periphery;
then applying the edge portion of the layer of resin adjacent to the shaped mold to cause the edge portion of the layer of resin to conform to a shape of the shaped mold;
applying a pattern, a design or an image to the layer of resin after allowing the liquid resin of the layer of resin to partially cure, but before the resin has fully cured, with the pattern, design or image in contact with the resin;
further curing the partially cured resin in an environment with an ambient temperature and an ambient pressure to transfer the pattern, the design or the image from a transfer medium to the layer of resin before the resin has fully cured;
removing the transfer medium from the layer of resin before the resin has fully cured and before applying the matrix material to the layer of resin;
applying a matrix material to the layer of resin; and
curing the matrix material and the layer of resin to form an integral composite resin panel.

22. The method of claim 1, wherein providing the raised periphery includes positioning peripheral elements on a flat surface.

23. The method of claim 22, wherein positioning the peripheral elements on the flat surface comprises positioning the peripheral elements on a production table.

24. The method of claim 22, wherein positioning the peripheral elements comprises securing strips to the flat surface.

25. The method of claim 24, wherein securing strips comprises securing strips of tape to the flat surface.

26. The method of claim 1, wherein moving the at least one peripheral portion includes lifting the at least one peripheral portion.

27. The method of claim 1, wherein positioning the edge mold on the flat surface of the flat mold comprises positioning, on the flat surface, an edge mold that includes a curved surface.

* * * * *

UNITED STATES PATENT AND TRADEMARK OFFICE
CERTIFICATE OF CORRECTION

PATENT NO. : 8,834,767 B1
APPLICATION NO. : 13/363371
DATED : September 16, 2014
INVENTOR(S) : Williamson et al.

It is certified that error appears in the above-identified patent and that said Letters Patent is hereby corrected as shown below:

In the Specification

Column 6, Line 29, change "P/8" to --1 1/8--

Column 6, Line 40, delete "and"

Column 8, Line 55, delete "curved"

Signed and Sealed this
Sixth Day of January, 2015

Michelle K. Lee
*Deputy Director of the United States Patent and Trademark Office*